United States Patent [19]

Colvert et al.

[11] 4,138,219

[45] Feb. 6, 1979

[54] APPARATUS FOR THE REGENERATION OF SOLID CATALYST

[75] Inventors: James H. Colvert, Houston; John P. MacLean, Stafford; Dale Williams; Henry B. Jones, both of Houston, all of Tex.

[73] Assignee: Texaco Inc., New York, N.Y.

[21] Appl. No.: 813,139

[22] Filed: Jul. 5, 1977

[51] Int. Cl.² .............................................. B01J 8/28
[52] U.S. Cl. .................... 422/144; 208/164; 208/120; 252/417; 209/474; 209/11; 422/145
[58] Field of Search ................... 23/288 B, 288 G; 208/164, 120; 252/417; 209/474, 493, 494, 11

[56] References Cited

U.S. PATENT DOCUMENTS

| | | | |
|---|---|---|---|
| 2,454,373 | 11/1948 | Blanding | 252/417 |
| 3,394,076 | 7/1968 | Bunn, Jr. et al. | 23/288 S X |
| 3,846,280 | 11/1974 | Owen et al. | 23/288 S X |
| 3,964,876 | 6/1976 | James | 23/288 B |

Primary Examiner—James H. Tayman, Jr.
Attorney, Agent, or Firm—Carl G. Ries; Thomas H. Whaley; Douglas H. May, Jr.

[57] ABSTRACT

Apparatus for the regeneration of fluidized solid catalyst including a regeneration chamber adapted to hold a fluidized solids bed, oxygen containing gas source communicating with the chamber, a tangential inlet communicating with the regeneration chamber to impart a swirling motion to spent catalyst entering the regeneration chamber and a free standing drawoff conduit disposed within the regeneration chamber, the drawoff conduit having an upper, open end in communication with the solids bed, the open end being formed by an obliquely truncated, outwardly flared portion of the conduit, the high portion of said truncated conduit lying closest the spent catalyst inlet.

3 Claims, 6 Drawing Figures

APPARATUS FOR THE REGENERATION OF SOLID CATALYST

BACKGROUND OF THE INVENTION

The present invention relates to the regeneration of solid catalysts. More specifically, the present invention relates to an apparatus for the regeneration of fluidized solid catalyst used in the catalytic cracking of hydrocarbons.

In usual hydrocarbon cracking processes, it is customary to contact a hydrocarbon feed stock with a fluidized solid catalyst in a reaction zone to effect at least partial conversion of the hydrocarbon to certain, desired conversion products. In the course of the reaction, there is a concomitant deposition of coke on the solid catalyst particles. To maintain efficiency of the reaction, the spent catalyst having the coke deposition thereon is continuously stripped and passed, as a dense phase, into the dense phase of a regenerator wherein the spent catalyst is contacted with an oxygen containing gas, e.g. air, thereby effecting combustion of at least a portion of the coke and regeneration of the catalyst. The regenerated catalyst is continuously withdrawn from the regenerator and returned to the reaction zone.

U.S. Pat. No. 3,394,076 discloses a process and apparatus for the regeneration of such fluidized solid catalyst. In the patented method and apparatus, a swirling motion is induced in the dense phase bed of the regeneration zone to extend the path of the solid particles traversing the regeneration zone and hence increase residence time of the catalyst particles in the regenerator. As noted in the subject patent, the extended path of catalyst particles travel is achieved by tangentially introducing the spent catalyst as a dense phase into the regeneration zone and withdrawing regenerated catalyst from the regeneration zone at a point circumferentially remote from the point of tangential introduction. The swirling motion imparted to the particles is further enhanced by passing effluent gases and entrained solids leaving the dense phase bed of the regeneration zone to gas-solid separating means oriented to receive the effluent gas traveling in the direction of the swirling motion without any substantial reversal of direction. Solids separated in the gas-solid separating zone are preferably returned to the dense phase bed of the regeneration zone in the direction of the swirling motion. Additionally, the oxygen containing regeneration gas may also be introduced into the dense phase bed of the regeneration zone in the direction of the swirling motion.

The above described method of regenerating spent catalyst employs apparatus including a generally cylindrical drawoff standpipe in open communication at its top with the interior of the regeneration chamber at a point above the operating level of the fluidized bed therein, the standpipe containing at least one aperture or window in its lower portion in open communication with the interior of the regeneration chamber at a point below the operating level of the fludized bed therein. A baffle is affixed to the standpipe below the aperture which baffle is inclined upwardly and outwardly so as to form a scoop. Additionally, there is a conical section depending from the cylindrical section of the standpipe and extending to the bottom of the regenerator. While the apparatus described above provides an efficient means for regenerating spent catalyst, it suffers from several disadvantages. For one, the rather complex configuration of the standpipe makes fabrication somewhat difficult. Additionally, because of its rather substantial length it is necessary that the standpipe be supported internally of the regenerator to give it sufficient rigidity. The provision of support members may interfere with the desired swirling motion of the catalyst particles and hence make regeneration less efficient. Additionally, the "windows" or apertures in the standpipe reduce the structural integrity of the standpipe and hence make it subject to failure. For example, regenerators employing the above described standpipes as catalyst drawoffs are subject to collapse at the point where the windows or apertures are cut with the result that the latter are virtually closed and preclude catalyst removal. When this occurs, it is necessary to shut down the regenerator and replace the catalyst drawoff standpipes.

SUMMARY OF THE INVENTION

It is therefore an object of the present invention to provide an improved apparatus for the regeneration of spent hydrocarbon cracking catalyst.

Another object of the present invention is to provide a catalyst regeneration apparatus employing a substantially free standing drawoff conduit.

A further object of the present invention is to provide a drawoff conduit for use with a solid catalyst regenerator which conduit is simple in construction and durable.

The above and other objects of the present invention will become apparent from the drawings, the description given above and the appended claims.

BRIEF DESCRIPTION OF THE DRAWINGS

FIG. 5 is an elevational, cross-sectional view showing a catalyst drawoff conduit according to the present invention.

DESCRIPTION OF THE PREFERRED EMBODIMENTS

Figure 1:
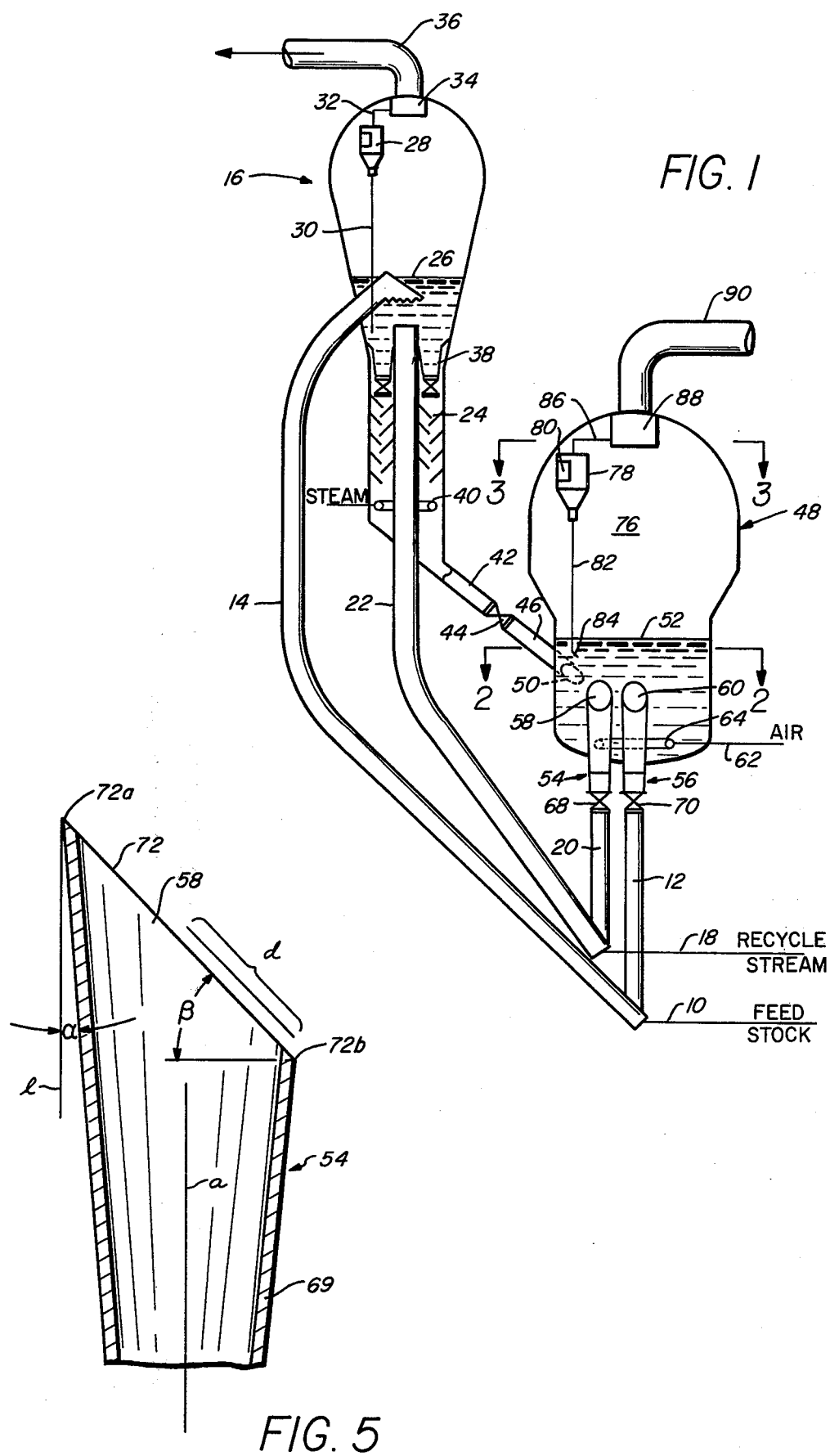
FIG. 1 is a schematic flow diagram of a fluid catalytic cracking unit showing a typical arrangement of the reactor and the regenerator.

Referring to the drawings, a virgin gas oil or similar hydrocarbon feed stock via line 10 and regenerated catalyst from line 12 are introduced through a fresh feed riser 14 into reactor 16. A second feed stream such as a recycle stream of gas oil via line 18 and regenerated catalyst from line 20 are introduced into reactor 16 through recycle feed riser 22. Recycle feed riser 22 extends upwardly through stripper 24 in reactor 16 and opens into the dense phase bed which has a level 26 in reactor 16. The gaseous cracking products and a small amount of entrained catalyst leave the bed in reactor 16 and enter cyclone separator 28 wherein entrained catalyst is separated and returned to the dense phase bed through dipleg 30. Separated gaseous products are discharged from cyclone 28 through line 32 to plenum 34 which may also act as a collector from other cyclone separators (not shown). Gaseous products from plenum 34 pass through product line 36 for further downstream processing.

In the course of the catalyst cracking process occurring in reactor 16, coke and other carbonaceous material is deposited on the fluidized solid catalyst necessitating regenerator of the latter. Fluidized solid catalyst is removed from reactor 16 through standpipe 38, and passed to stripper 24 wherein entrained and occluded hydrocarbons are displaced by stripping steam introduced through steam ring 40. The stripped, spent catalyst from stripper 24 passes through return conduit 42, slide valve 44, spent catalyst inlet conduit 46 and into regenerator 48. As best seen with reference to FIGS. 1-4, inlet conduit 46 communicates with regenerator 48 tangentially to form spent catalyst inlet 50 in the lower cylindrical wall of regenerator 48.

A dense phase bed having an upper level 52 is maintained in regenerator 48, spent catalyst being introduced into regenerator 48 through inlet 50 below level 52. The introduction of spent catalyst via inlet conduit 56 as a dense phase directed into the dense phase of regenerator 48 avoids localized high temperatures which might result when oxygen rich air meets high carbon containing catalyst such as may be encountered in transporting catalyst from a reactor to a regenerator as a suspension in the burning air. Because of the tangential introduction of the spent catalyst particles into regenerator 48 through inlet 50, a horizontal component of velocity is imparted to the catalyst particles. Since the dense phase bed is confined by the cylindrical, lower wall of the regenerator 48, a swirling motion is imparted to the particles. Regenerated catalyst is withdrawn from regenerator 48 through drawoff standpipes 54 and 56 which are disposed circumferentially remote from tangential inlet 50, the catalyst entering drawoff conduits 54 and 56 through the upper open ends 58 and 60, respectively, a more precise description of which follows below. In this way, catalyst introduced through inlet 50 follows a peripheral path from inlet to outlet. Such a peripheral path is substantially greater than the straight line distance between the inlet and outlet. The elongated path required by the relative location of the inlet and outlet and the method of introducing the catalyst results in a longer residence time and enhances removal of coke from the solid catalyst.

Figure 6:
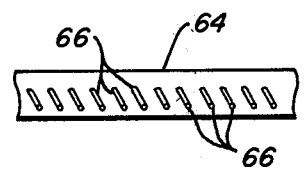
FIG. 6 is a view of a part of an air ring used in the regenerator of the present invention.

Oxygen containing gas, for example air, is introduced into regenerator 48 through line 62, air ring 64 and nozzles 66 (see FIG. 6). Air ring 64 is preferably concentrically aligned in the lower portion of regenerator 48 below dense phase level 52. Nozzles 66 are advantageously spaced from the bottom portion of air ring 64 or may be inclined, as shown in FIG. 6, in the direction of swirl to enhance the swirling motion of the solid catalyst particles.

The catalyst particles entering regenerator 48 through tangential inlet 50 are suspended in the regenerating gas in the regenerator 48, the resulting suspension exhibiting many of the characteristics of a fluid. The coke or carbonaceous material coated on the catalyst particles is burned away by the oxygen in the regeneration gases.

As noted, the regenerated catalyst passes through the open ends 58 and 60 of drawoff conduits 54 and 56, respectively. Drawoff conduit 54 communicates through slide valve 68 and standpipe 20 with recycle feed riser 22 while drawoff conduit 56 communicates through slide valve 70 with standpipe 12 and fresh feed riser 14. Drawoff conduits 54 and 56 are disposed in regenerator 48 such that their respective open ends 58 and 60 are below level 52, i.e. are in open communication with the dense phase in regenerator 48.

Figure 2:
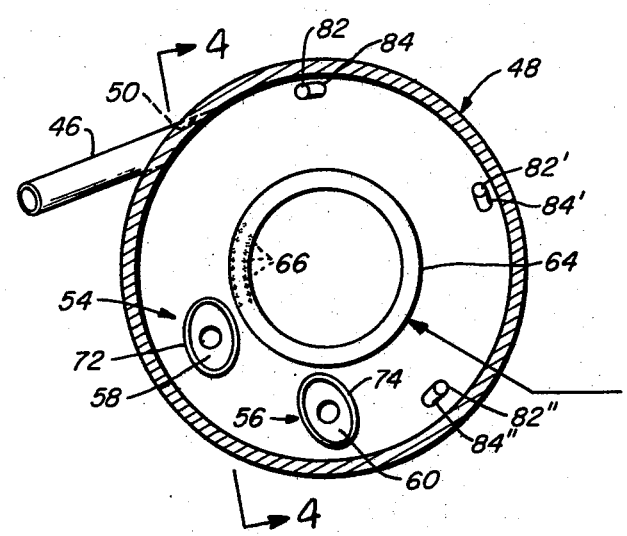
FIG. 2 is a cross-sectional view taken on the line 2—2 of FIG. 1.
Figure 4:
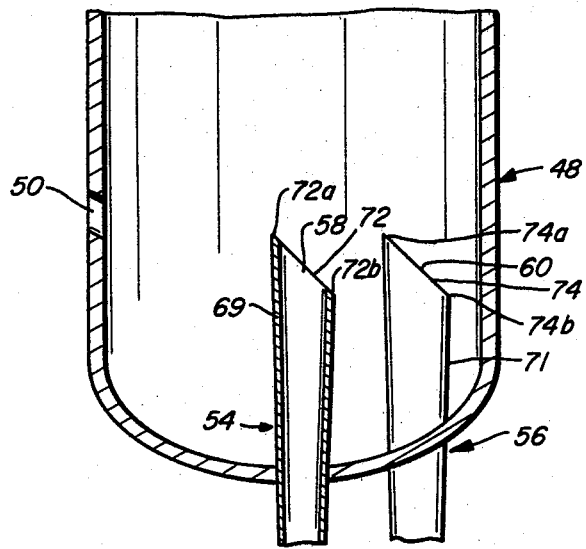
FIG. 4 is a view taken on the line 4—4 of FIG. 2.

As best seen with reference in FIGS. 1, 2 and 4, drawoff conduits 54 and 56 have outwardly flared portions 69 and 71, respectively, adjacent open ends 58 and 60, respectively. While in the preferred case flared portions 69 and 71 will be frustoconical in shape and, more especially but not necessarily, be defined by the frustum of a right circular cone, outwardly flared portions 69 and 71 can have other configurations. Thus for example flared portions defined by truncated eliptic paraboloids or truncated hyperboloids of one sheet are suitable flared configurations which can be employed in constructing the drawoff conduits of the present invention. Additionally, the open ends 58 and 60 are defined by rim portions 72 and 74, respectively, the portions of which lie closest spent catalyst inlet 50 being upset, as at 72a and 74a, respectively, with respect to the remainder of the rims 72 and 74.

With particular reference to FIG. 2, open ends 58 and 60 define elipses which are formed by obliquely truncating a right circular cone. Thus, rims 72 and 74 can be viewed as the intersection of flared portions 69 and 71 with planes passing therethrough and oblique to the axes of the frustoconical sections defined by such flared portions. As can best be seen with reference to FIG. 4, the upsetting of rims 72 and 74 prevents spent catalyst entering inlet 50 from flowing in a substantially straight line path across regenerator 48 into the open ends 58 and 60. Rather, the catalyst particles are forced to traverse the inner periphery of regenerator 48 and enter drawoff conduits 54 and 56 on the lower, downset sides 72b and 74b, respectively.

In the preferred embodiment, as noted above, drawoff conduits 54 and 56 will be frustoconical in shape. In FIG. 5 is shown an enlarged section of one of the drawoff conduits as for example drawoff conduit 54, the figure depicting certain preferred structural configurations of the drawoff conduit when the flared portion is defined by a frustum of a right circular cone. Thus, for example, in a typical commercial regenerator, the angle $\alpha$ between the wall of the flared portion 68 and a line l lying parallel to the axis a of the flared portion 68 is preferably from about 5° to about 10°, especially about 7°. It is also been found preferable, in the case where the flared portion 68 is defined by the frustum of a right circular cone and open end 58 defines an elipse that the angle $\beta$ formed between a plane passing through the rim 72 and a plane perpendicular to the axis a be from about 40° to about 70°. It will be understood that depending upon the size of the regenerator other structural configurations may be used, the ones given above being preferred for a typical commercial regenerator. While as shown, and in the preferred case, drawoff conduits 54 and 56 will be frustoconical for substantially their entire extension into regenerator 48, such is not necessary. It is only necessary, as explained above, that the flared portion adjacent the open ends of the drawoff conduits 54 and 56 be flared in the manner shown. Thus, for example, drawoff conduits 54 and 56 could terminate at their upper end in the frustoconical configuration as shown and be adjoined to a substantially cylindrical portion which would extend downwardly through the bottom of the regenerator.

The flared portion of the drawoff conduits adjacent the open ends thereof serve several purposes. In addition to the swirl imparted to the catalyst particles in a horizontal plane, the particles undergo a torroidal motion caused by the flow of regeneration gases into the center of the contacting zone in regenerator 48. Thus, a vertical component of motion is also imparted to the catalyst particles. The net effect of these combined components of motion is that solids which separate in the disperse phase of the contacting zone have a tendency to fall downwardly at the walls of the contacting zone. The elipse shaped open ends of the drawoff conduits act as scoops to collect the downwardly circulating catalyst particles. Additionally, the outwardly flared configuration of the drawoff conduits serve as deflectors to direct the rising regeneration gases away from the open catalyst receiving ends of the drawoff conduits. The funnelling effect provided by the unique configuration of the drawoff conduits results in larger and more continuous amounts of catalyst particles being collected by the drawoff conduits. it has also been found that as the catalyst particles approach the open ends of the drawoff conduits, they undergo a downwardly spiralling path. It is desirable that this path be as long as possible to increase the overall residence time of the catalyst particles in the regenerator. For a typical commercial regenerator, and when the drawoff conduits have a flared portion comprised of a frustum of a right circular cone, the center of the elipse which defines the open end of the drawoff conduit should be from about 6 to about 10' from the lower edge or downset side of the rim defining the open end of the drawoff conduit. This distance is shown as d in FIG. 5.

Combustion gases leaving the dense phase bed at level 52 and entrained catalyst pass through the disengaging space 76 in the upper portion of the regenerator 48 to gas solids separating cyclone 78 having inlet 80. Inlet 80 is oriented to receive gases rotating in the same general direction as the catalyst particles introduced into regenerator 48 through tangential inlet 50 without reversal of direction. Although only a single cyclone separator is shown in FIG. 1, it will be understood that a plurality of cyclones may be assembled to provide two or more stages of solid-gas separation and a plurality of single or plural stage assemblies may be employed depending on the gas handling capacity of the particular cylone system employed and the total amount of gas to be handled. Solids separated in cyclone 78 are returned to the bed in regenerator 48 by cyclone dipleg 82. Dipleg outlet 84 is oriented to direct the return solids in the same general direction of swirl as that imparted to the catalyst particles introduced through tangential inlet 50. Typically, the catalyst returned through dipleg outlet 84 may be about 120% of the catalyst circulated through the dense phase inlet line 46, and thus the return of the catalyst in the direction of the swirl substantially augments the swirling flow of the catalyst particles. Gases from cyclone 78 pass via line 86 to plenum 88 and thence into vent line 90. Gases leaving the system via line 90 may be expanded through power generation or heat recovery systems well known in the art.

Figure 3:
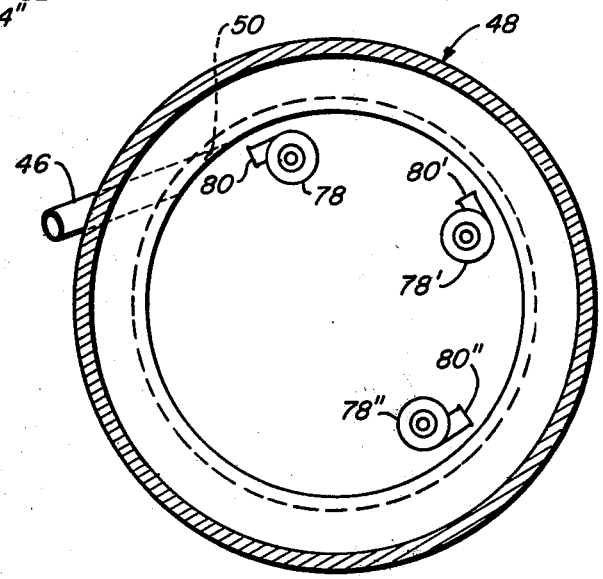
FIG. 3 is a cross-sectional view taken on the line 3—3 of FIG. 1.

FIGS. 2 and 3 show additional exemplary single stage gas-solids separating cyclones 78' and 78'' having inlets 80' and 80'', respectively, cyclone diplegs 82' and 82'', respectively, and dipleg outlet 84'' and 84'', respectively. As shown, preferably when a plurality of cyclone separators are employed as depicted in FIGS. 2 and 3, the cyclones will have the inlets oriented to enhance the swirling, clockwise flow imparted to the catalyst particles entering the regenerator.

It will be apparent from the description given above, that the catalyst regenerator of the present invention provides many advantages over prior art regenerators. The novel construction of the drawoff conduit permits the conduit to be substantially free standing within the regenerator housing eliminating the need for support members that are required in such systems as shown in U.S. Pat. No. 3,394,076. As noted earlier, the elimination of such support members which generally extend from the inner peripheral walls of the regenerator generally radially inwardly to support the drawoff conduit tend to interfere with the desired swirling motion of the catalyst particles in the dense phase bed. Additionally, the elimination of windows or other such apertures cut into the side of the drawoff conduit or standpipe eliminates the possibility that the drawoff conduit will collapse or bend at the point where such windows are made.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalence of the claims are therefore intended to be embraced therein.

We claim:

1. In a Fluidized Catalytic Cracking Unit regenerator for burning coke from spent cracking catalyst with oxygen containing gas to produce a flue gas and regenerated cracking catalyst, which comprises a vertical, cylindrical regeneration vessel adapted to contain a bed of fluidized cracking catalyst in the lower portion thereof and a dilute phase of catalyst and flue gas in the upper portion thereof, a dense phase solid inlet conduit tangentially entering the lower portion of said regeneration vessel and forming a spent catalyst inlet, means for introducing oxygen containing regeneration gas into the bottom of said regeneration vessel, cyclone separator means for separating catalyst from flue gas in said dilute phase, cyclone separator dipleg means for returning separated catalyst to said fluidized dense phase catalyst bed, means for withdrawing flue gas from said regeneration vessel, and means for withdrawing regenerated catalyst from said regenerator vessel, the improvement comprising:

a. said means for withdrawing regenerated catalyst comprising a substantially vertical drawoff conduit having outwardly flared walls defined by the frustrum of a right circular cone, having an eliptical open upper end defined by a rim having a high side and a low side in communication with said fluidized catalyst bed, wherein a plane defined by said open end rim is at an angle to horizontal such that the center of said eliptical open end is from about 6 inches to about 10 inches from the lower edge of said rim, and wherein said drawoff conduit is situated within said regenerator vessel circumferentially remote from said spent catalyst inlet such that the higher side of said open end rim is closest to said spent catalyst inlet;

b. said cyclone separator means having inlet means arrayed to face a path defined by circulating catalyst entering said regeneration vessel through said spent catalyst inlet and continuing about the periphery of said regeneration vessel, for receiving catalyst and flue gas from said dilute phase without a reversal of flow direction;

c. said dipleg means including dipleg discharge means arrayed for directing catalyst discharging from said dipleg means into said catalyst fluidized bed in the direction of a path defined by circulating catalyst entering said regeneration vessel through said spent catalyst inlet and continuing about the periphery of said regeneration vessel; and d. said means for introducing oxygen containing regeneration gas comprising a conduit having nozzles opening into the lower portion of said regeneration vessel wherein said nozzles are inclined in the direction of the path defined by circulating catalyst entering said regeneration vessel through said spent catalyst inlet and continuing about the periphery of said regeneration vessel.

2. The apparatus of claim 1 wherein the outwardly flared wall of said vertical drawoff conduit is from about 5° to 10° from vertical.

3. The apparatus of claim 2 wherein the angle of a plane defined by said vertical conduit rim is from about 40° to about 70° from horizontal.

* * * * *